(12) United States Patent
Rasmussen

(10) Patent No.: US 10,607,025 B2
(45) Date of Patent: Mar. 31, 2020

(54) ACCESS CONTROL THROUGH DATA STRUCTURES

(71) Applicant: PeerNova, Inc., San Jose, CA (US)

(72) Inventor: Andrew James Rasmussen, San Diego, CA (US)

(73) Assignee: PeerNova, Inc., San Jose, CA (US)

( * ) Notice: Subject to any disclaimer, the term of this patent is extended or adjusted under 35 U.S.C. 154(b) by 381 days.

(21) Appl. No.: 15/267,116

(22) Filed: Sep. 15, 2016

(65) Prior Publication Data

US 2018/0075252 A1   Mar. 15, 2018

(51) Int. Cl.
G06F 21/62   (2013.01)
H04L 9/32   (2006.01)
H04L 29/06   (2006.01)

(52) U.S. Cl.
CPC ........ G06F 21/6227 (2013.01); H04L 9/3247 (2013.01); *G06F 2221/2141* (2013.01)

(58) Field of Classification Search
CPC .. G06F 21/6227; H04L 63/123; H04L 9/3247
See application file for complete search history.

(56) References Cited

U.S. PATENT DOCUMENTS

| | | | |
|---|---|---|---|
| 8,209,531 B2 | 6/2012 | Gentry et al. | |
| 8,776,216 B2 | 7/2014 | Boccon-Gibod et al. | |
| 8,832,466 B1 | 9/2014 | McGregor, Jr. et al. | |
| 9,008,303 B1 * | 4/2015 | Juels | H04L 9/0869 380/44 |
| 2005/0114666 A1 | 5/2005 | Sudia | |
| 2008/0263370 A1 * | 10/2008 | Hammoutene | G06F 21/6245 713/193 |
| 2014/0201520 A1 * | 7/2014 | Yacobi | H04L 9/3073 713/158 |

OTHER PUBLICATIONS

PCT International Search Report and Written Opinion, PCT Application No. PCT/US2017/050048, dated Nov. 7, 2017, 22 pages.
European Patent Office, Extended European Search Report and Opinion, EP Patent Application No. 17851326.3, dated Jan. 29, 2020, six pages.

* cited by examiner

*Primary Examiner* — Noura Zoubair
(74) *Attorney, Agent, or Firm* — Fenwick & West LLP

(57) ABSTRACT

A data structure includes data that allows specific users to access data items that are part of the data structure and allows the users to store data items in association with the data structure. The data structure includes a root node which is the genesis of the data structure. The data structure further includes an access node for each user granted access rights to the data structure. An access node granting a user access rights to the data structure is directly connected to the root node. For a user whose access rights to the data structure are revoked, the data structure includes an additional access node directly connected to the access node that gave the user access rights. The data structure also includes a record node for each data item that is part of the data structure. Each record node is connected to the root node directly or indirectly.

11 Claims, 12 Drawing Sheets

ACCESS CONTROL THROUGH DATA STRUCTURES

BACKGROUND

1. Field of Art

The present disclosure generally pertains to the storage of data, and in particular to storing and controlling access to data through a data structure.

2. Description of the Related Art

Data stored by storage systems needs to be protected so that unauthorized entities do not get access to the data. Processes that are external to the stored data are heavily relied upon to protect the data. For example, processes may require that users provide authentication information (e.g., user name and password) to be able to access stored data. However, these processes are susceptible to security breach and entities may find ways to access the data without permission. Since the processes are external to the data, it is not possible to make attestations that the data has not been accessed or modified by unauthorized entities.

SUMMARY

A data structure is described herein that relies on cryptographic principles to store data items (e.g., documents, images, videos, etc.) and control access to the stored data items. When an administrator wishes to restrict access to one or more data items to select users, a data storage system initiates a data structure by creating a root node.

The data storage system includes at least one record node in the data structure for each data item that is part of the data structure. Each record node is connected to the root node directly or indirectly through one or more record nodes. A record node includes the associated data item along with an input and an output. The input is a hash digest of the parent node directly connected to the record node. In one embodiment, the output is a public key of a user that has ownership rights to the node. When a user has ownership rights to a record node, it signifies that the user can add a data item that is directly linked to the record node. For example, assume a record node includes a document. The output of the record node may include the public key of a user that is to make revisions to the document. In other embodiments, the output of a record node includes constraints, different or in addition to a public key, that indicate ownership rights of the record node. The output may include one or more public keys, business logic, executable code, or any combination of the aforementioned to indicate ownership rights of the record node.

If the administrator requests to grant a user access rights to the data structure, the data storage system creates an access node that is connected to the root node as a child node. The created access node includes an input and an output. The input is a hash digest of the root node and the output is a public key of the user being granted access rights to the data structure. The access node additionally includes data that indicates the user associated with the public key has been granted access rights to the data structure. Similar to the output of the record node, in other embodiments the output of an access node can include different information to indicate the user being granted access rights to the data structure. For example, the output may include one or more public keys, business logic, executable code, or any combination of the aforementioned to indicate a user that has access rights to the data structure.

If the administrator later requests to revoke the user's access rights, the data storage system creates a new access node as a child of the node that granted the user access. The new node includes an input that is a hash digest of the parent node that granted the user access. The new node also include data indicating that the access rights of the user associated with the public key have been revoked.

When a user requests to access a data item associated with a record node of the data structure, the data storage system determines whether the user has access rights to the data structure. To determine whether the user has access rights to the data structure, the data storage system identifies a digital signature included with the request. The digital signature is created using the user's private key. The data storage system additionally identifies the access nodes in the data structure that include a hash digest of the root node as an input and have no child node. The identified access nodes are the access nodes of the users that currently have access rights to the data structure. If the data storage system is able to verify the digital signature using an output public key of one of the identified access nodes, the data storage system determines that the user has access rights to the data structure and provides the data item to the user.

When a user that has access rights to the data structure requests to store a data item linked to a record node of the data structure, the data storage system determines whether the user has ownership rights to the record node. The data storage system determines that the user has ownership rights to the record node if it is able to verify a digital signature included with the request using an output public key of the record node. If the data storage system determines that the user has ownership rights to the record node, the data storage system creates a new record node as a child of the record node to which the user has ownership rights. The new record node includes the data item.

The figures depict, and the detail description describes, various non-limiting embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
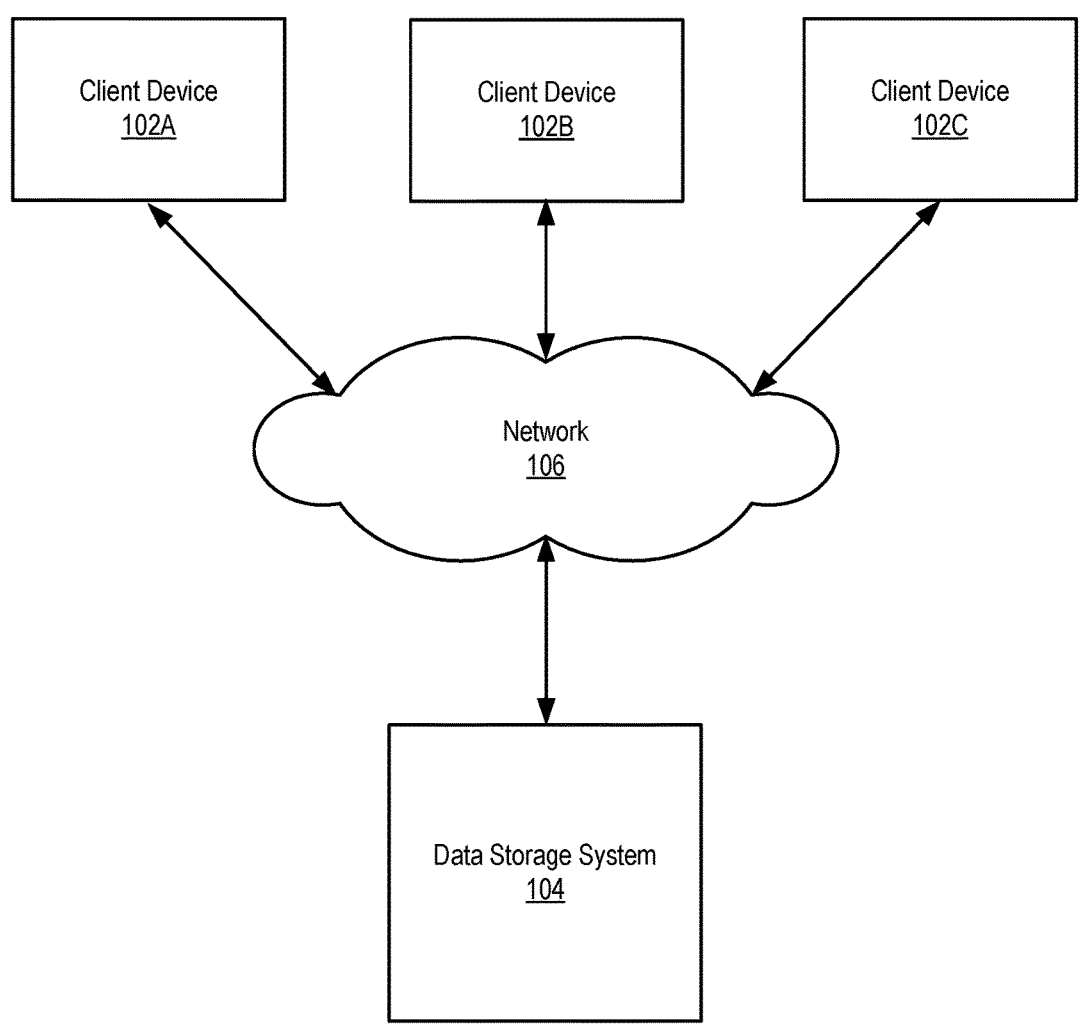
FIG. 1 is a block diagram of a data storage environment in accordance with one embodiment.

FIG. 1 is a block diagram of a data storage environment 100 in accordance with one embodiment. The data storage environment 100 includes client devices 102A, 102B, and 102C and a data storage system 104 connected via a network 106. Although the illustrated environment 100 includes only a select number of each entity, other embodiments can include more or less of each entity (e.g., additional client devices 102).

FIG. 1 and the other figures use like reference numerals to identify like elements. A letter after a reference numeral, such as "102A," indicates that the text refers specifically to the element having that particular reference numeral. A reference numeral in the text without a following letter, such as "102," refers to any or all of the elements in the figures bearing that reference numeral.

The network 106 represents the communication pathways between the client devices 102 and the data storage system 104. In one embodiment, the network 106 is the Internet and uses standard communications technologies and/or protocols. The network 106 can also utilize dedicated, custom, or private communications links that are not necessarily part of the Internet. The network 106 may comprise any combination of local area and/or wide area networks, using wired and/or wireless communication systems. In one embodiment, information exchanged via the network 106 is encrypted and decrypted using cryptographic keys of the senders and the intended recipients.

A client device 102 is a device used by a user to communicate with the data storage system 104. A client device 102 may be, for example, a personal computer, smart phone, tablet computer, or personal digital assistant (PDA). A client device 102 stores a cryptographic key pair of a user. The cryptographic key pair includes a public key that can disseminated freely and a private key known specifically by the user. Both the public key and the private key are related to each other.

Through a client device 102 a user communicates with the data storage system 104 to store data items with the system 104 and access data items stored by the system 104. When the client device 102 transmits a request to store or access a data item, the client device 102 includes with the request a digital signature generated using the user's private key. The digital signature is used by the data storage system 104 to verify that the user has authority to store or access the data item.

The data storage system 104 is a computer system that stores data items and controls access to the data items through data structures, according to the embodiments explained herein. The data storage system 104 stores multiple data structures. Each data structure includes data that allows specific users to access data items that are part of the data structure and allows the users to store data items in association with the data structure. A data item is a collection of data or a portion of a collection of data. For example, a data item may be a document, an image, a video, a presentation, an audio file, etc.

A data structure includes a root node which is the genesis of the data structure. The root node includes the public key of the administrator of the data structure. An administrator is a user that has control over which users are given access to the data structure. The data structure further includes an access node for each user granted access rights to the data structure. An access node granting a user access rights to the data structure is directly connected to the root node as a child node. The access node includes an input that is a hash digest of the root node, an output that is the public key of the user granted access rights, and data indicating the user associated with the public key has been granted access rights to the data structure. In one embodiment, a user with access rights to the data structure can access each data item that is part of the data structure and can also store a data item in association with the data structure. As described herein, a hash digest is the result of a one-way cryptographic hash function applied to data, which is designed to make inversion infeasible. The hash function may be, for example, a SHA-256 hash function.

For a user whose access rights to the data structure are revoked, the data structure includes an additional access node directly connected to the access node that gave the user access rights to the data structure. The additional access node is a child of the access node that gave the user access rights. The additional access node includes an input which is a hash digest of the access node that gave the user access rights. In one embodiment, the additional access node includes an output which is a public key of the administrator that revoked the user's access rights and also includes data indicating that the access rights of the user have been revoked.

The data structure also includes a record node for each data item that is part of the data structure. Each record node is linked to the root node directly or indirectly through one or more record nodes. A record node includes an input, an output, and the data item of the node. The input is a hash digest of the parent node that is directly connected to the record node. The output is a public key of the user that has been given ownership rights to the record node. A user with ownership rights to a record node can add a data item directly linked to the record node. Linking record nodes in the data structures allows the data structure to include information on the relationships between data items. For example, the record nodes of different versions of a data item may be linked in the data structure. As described herein, a node (e.g., root node, access node, and record node) is a basic unit of a data structure.

Figure 2A:
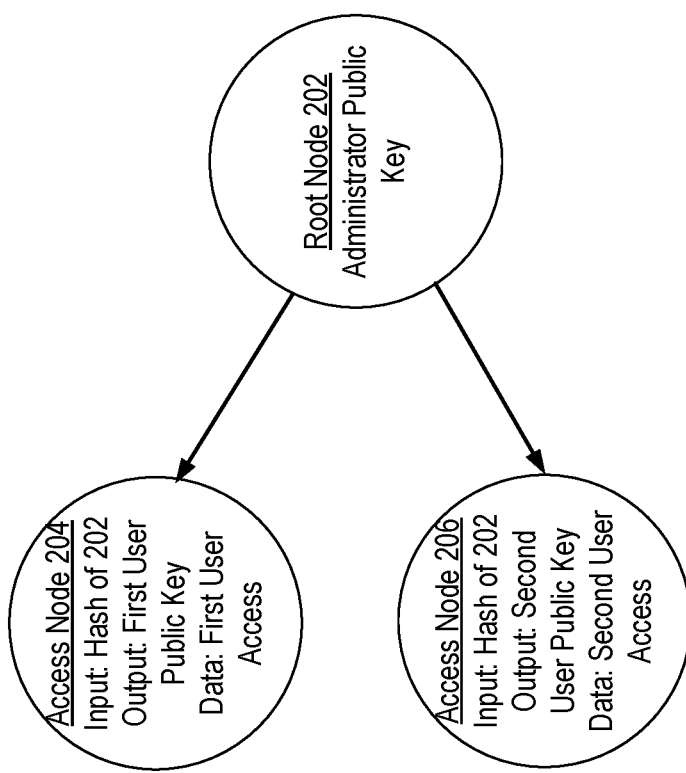
FIGS. 2A-2E illustrate examples of a data structure in accordance with one embodiment.

FIGS. 2A-2E illustrate examples of a data structure 200 in accordance with one embodiment. FIG. 2A illustrates the data structure 200 including root node 202, access node 204, access node 206. The root node 202 includes the public key of the administrator that initiated the creation of the data structure 200. Access node 204 provides a first user with access rights to the data structure 200 and access node 206 provides a second user with access right to the data structure 200. The data storage system 104 creates access nodes 204 and 206 at the request of the administrator. Access node 204 includes an input that is a hash digest of the root node 202, an output that is a public key of the first user, and data indicating that the first user associated with the public key has access to the data structure 200. Access node 206 includes an input that is a hash digest of the root node 202, an output that is a public key of the second user, and data indicating that the second user associated with the public key has access to the data structure 200.

Figure 2B:
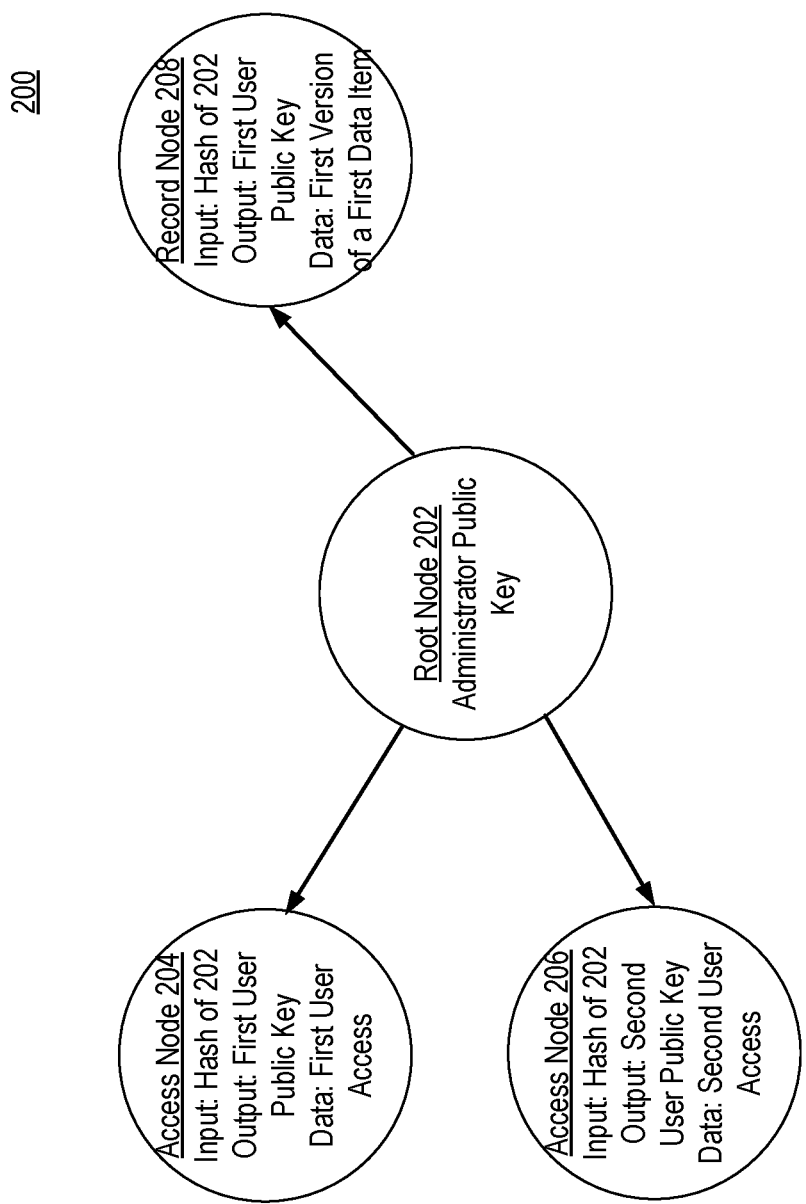

FIG. 2B illustrates a record node 208 added to the data structure 200 by the data storage system 104 at the request of the administrator. The record node 202 includes an input that is a hash digest of the root node 202, an output that is the public key of the first user, and a first version of a first data item. Since record node 208 includes the first user's public key as an output, the first user has ownership rights to the record node 208 and can add a data item directly linked to the record node 208. The second user cannot add a data item linked to the record node 202 since the second user's public key is not included as an output of the record node 208.

However, because the second user has access rights to the data structure 200 through access node 206, the second user could access the first version of the first data item. If the second user requests to access the first version of the first data item, the data storage system 104 determines that the second user can access the first version of the first data item because the system 104 is able to verify a digital signature provided by the second user using the output public key of one of the access nodes 204 or 206. In this example, data storage system 104 would verify the digital signature using the public key of the second user included in access node 206. After verifying that the second user has access rights to the data structure, the data storage system 104 provides to the second user the first version of the first data item. If a third user, who has not been given access rights to the data structure, requests to access the first version of the first data item, the data storage system 104 will deny the request because access nodes 204 and 206 do not include the third user's public key.

Figure 2C:
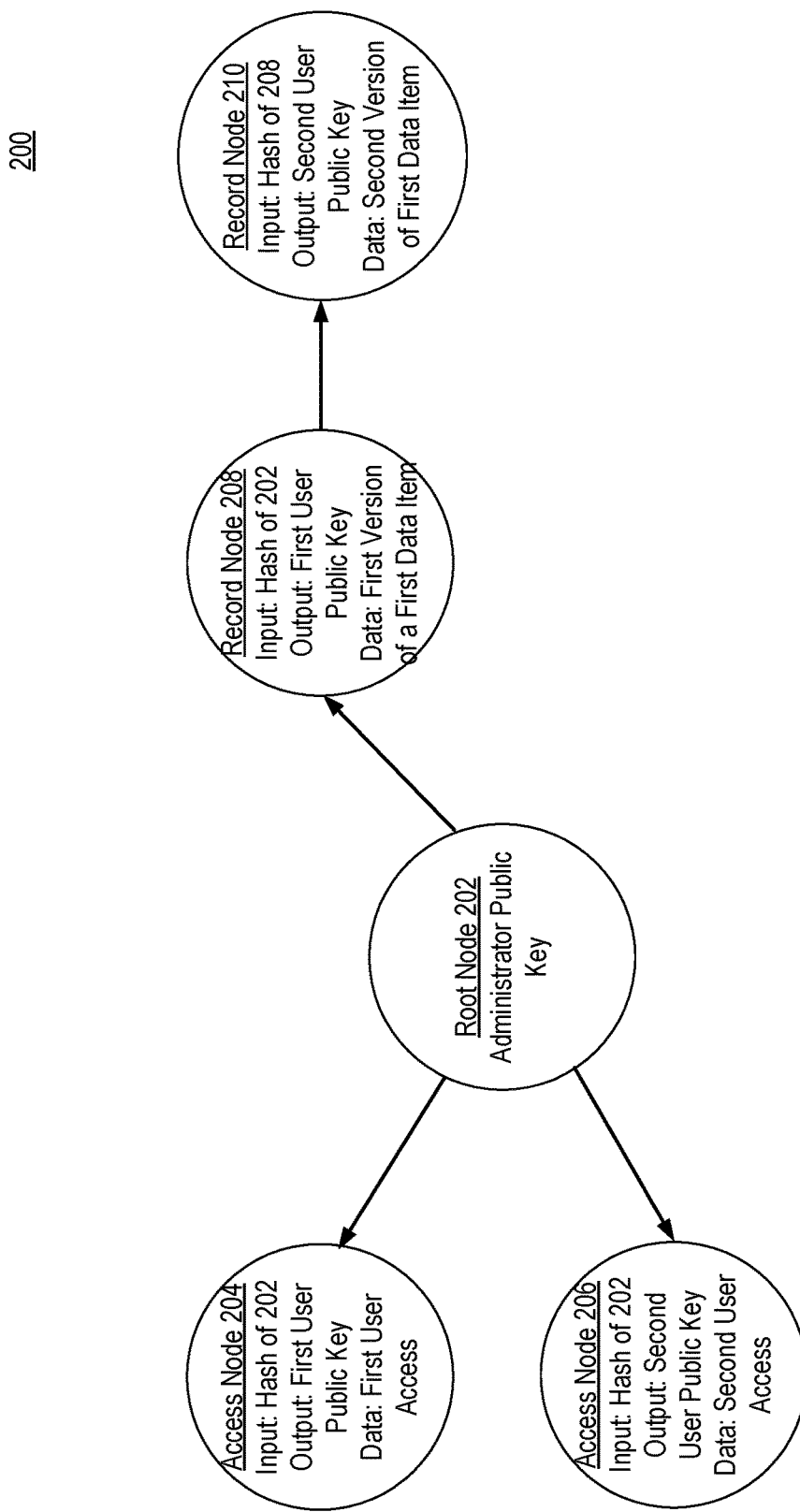

If the first user requests to store a second version of the first data item linked to record node 208, the data storage system 104 will allow it because record node 208 includes the first user's public key as an output and as a result a digital signature included by the first user with the request can be verified using the output public key of record node 208. FIG. 2C illustrates recorded node 210 added by the data storage system 104 to the data structure 200 with the second version of the first data item and connected to record node 208. Record node 210 includes an input that is a hash digest of record node 208 and an output that is the public key of the second user. Hence, in this example the second user has been given ownership rights to record node 210 and can add a data item directly linked to record node 210.

Figure 2D:
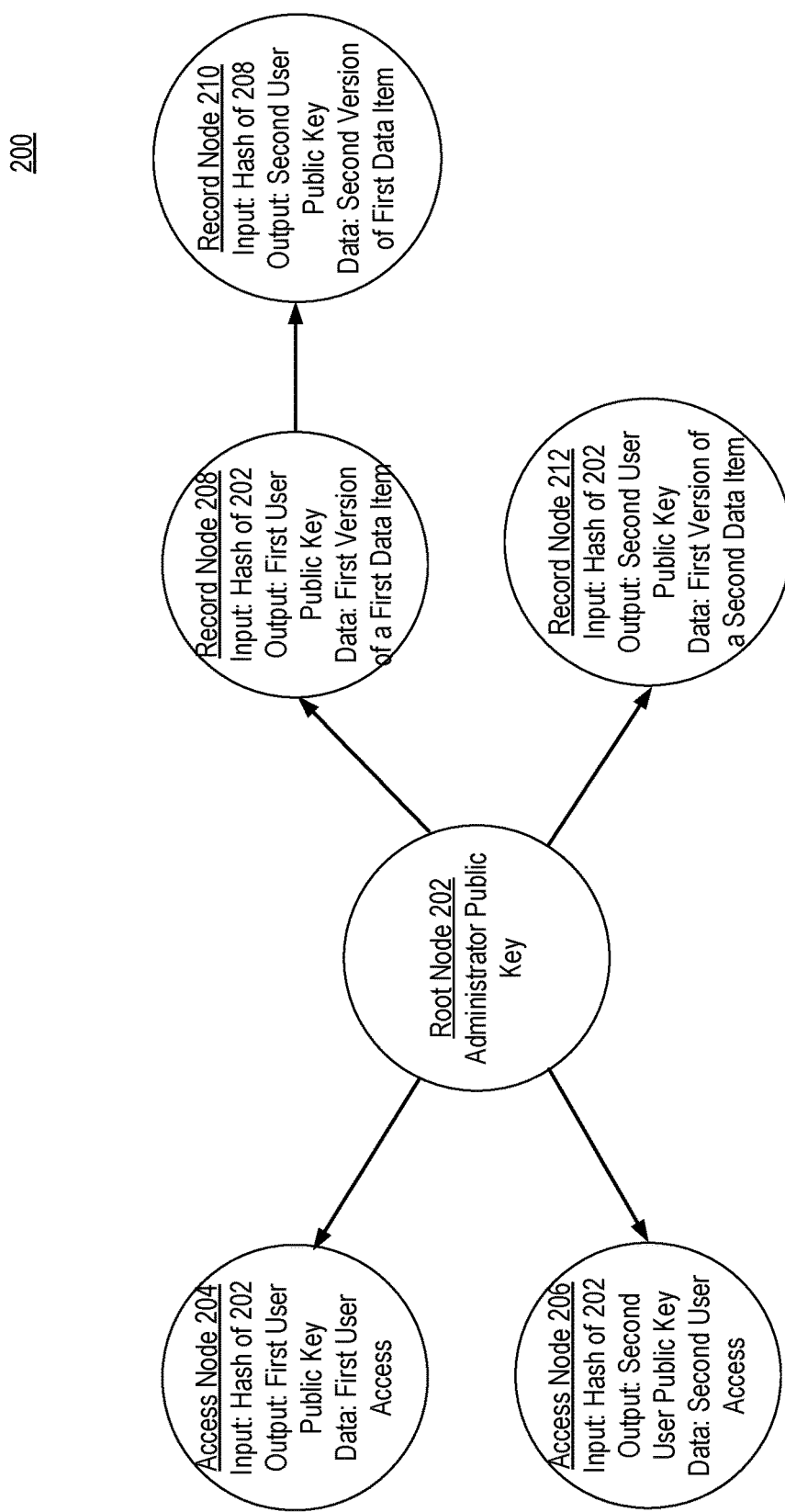

FIG. 2D illustrates record node 212 added to the data structure by the data storage system 104 at the request of the administrator. The record node 212 includes an input that is a hash digest of the root node 202, an output that is the public key of the second user, and a first version of a second data item. Since the output has the public key of the second user, the second user has ownership rights to record node 212 and can add a data item linked to record node 212 (e.g., a second version of the second data item).

Figure 2E:
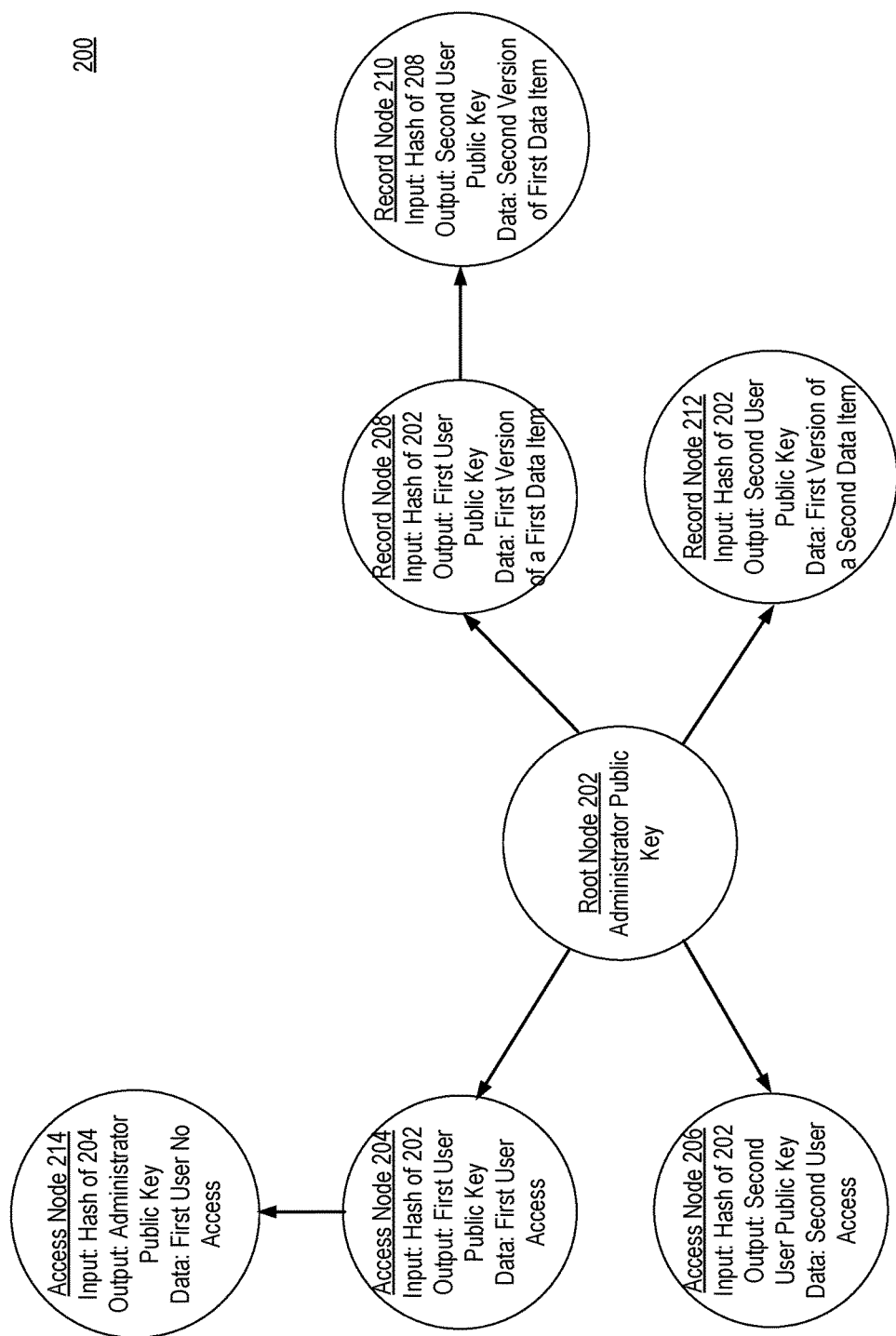

As illustrated by FIG. 2E, if the administrator requests to revoke the first user's access right to the data structure 200, the data storage system 104 revokes the first user's access right by adding an access node 214 to the data structure 200. The access node 214 is directly connected to access node 204 as a child node. Access node 214 includes an input that is a hash digest of access node 204, an output that is the public key of the administrator, and data that indicates that the first user no longer has access rights to the data structure 200. Since access node 204 now has a child node (access node 214), access node 204 will not be considered by the data storage system 104 in determining access rights to the data structure 200.

For example, if the first user requests to access the data item included in one of the record nodes 208, 210, or 212, the data storage system 104 will determine whether the first user has access rights to the data structure by identifying a digital signature included by the first user with the request and by identifying access nodes in the data structure that have no child node. In the example of FIG. 2E, the data storage system 104 will only identify access node 206. The data storage system 104 determines that the first user is not able to access the data structure because the data storage system 104 is not able to verify the first user's digital signature using the public key of the second user included in access node 206 as an output. The data storage system 104 denies the first user's request since the first user no longer has access rights to the data structure.

As can be seen in FIG. 2E, each node that is directly connected to the root node is part of a different cryptographic node lineage. For example, a first node lineage includes root node 202, record node 208, and record node 210. A second node lineage includes root node 202, access node 204, and access node 214. A third node lineage includes root node 202 and access node 206. A fourth node lineage includes root node 202 and record node 212. The nodes of each lineage are cryptographically linked from the last node in the lineage to the root node through their deterministic inputs. For example, for the lineage that includes root node 202, record node 208, and record node 210, the input of record node 208 is a hash digest of root node 202. The input of record node 210 is a hash digest of record node 208. Hence, the nodes of a lineage are cryptographically linked by each node of the lineage including an input that is a hash digest of the parent node directly connected to it.

As a result of each node lineage including nodes that are cryptographically linked, it provides proof of integrity for the data stored by the data structure. Proof of integrity for a cryptographic lineage can be provided by recalculating the hash digest for each input of the nodes that are part of the lineage. If the input hash digest calculated for a node does not match the input included in the data structure for the node, the data storage system 104 can determine that one or more nodes in the lineage have been altered. Returning to the example of FIG. 2E, assume that at some later time the data storage system 104 recalculates the input of record node 208 by hashing root node 202. If the calculated input does not match the input included in record node 208, the data storage system 104 determines that the root node 202 has been altered. The data storage system 104 may also recalculate the input of record node 210 in addition or instead of the input of record node 208. The data storage system 104 recalculates the input by hashing record node 208. If the recalculated input does not match the input of record node 210, the data storage system 104 determines that record node 208 and/or the root node 202 have been altered.

Further, as shown in the examples of FIGS. 2A-2E, the data that is used to control access to data items, i.e., the access nodes, is included within the same data structure as the data items. FIG. 2E shows access node 204, 206, and 214 as part of the same structure 200 as record nodes 208, 210, and 212. Hence, the data storage system 104 does not have to rely on external systems or data structures to control access to the data items that are part of the data structure.

Figure 3:
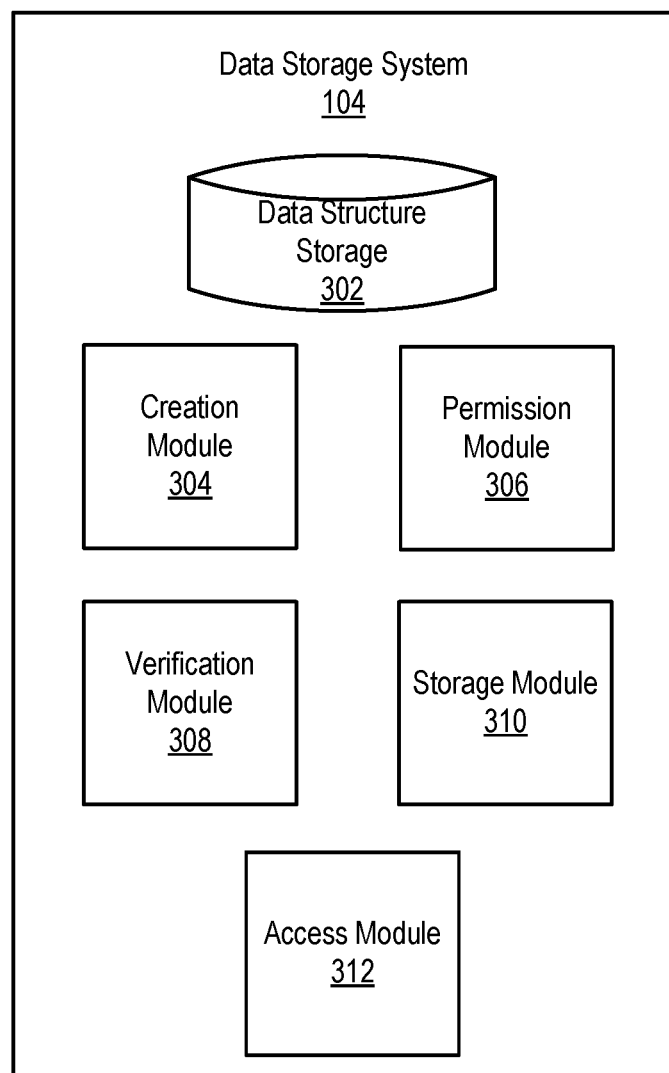
FIG. 3 is a block diagram of a data storage system in accordance with one embodiment.

FIG. 3 is a block diagram illustrating components of the data storage system 104 in accordance with one embodiment. The data storage system 104 includes a data structure storage 302, a creation module 304, a permission module 306, a verification module 308, a storage module 310, and an access module 312. Those of skill in the art will recognize that other embodiments of the interface system 104 can have different and/or other components than the ones described here, and that functionalities can be distributed among components in a different manner.

The data structure storage 302 stores data structures. Each data structure includes data items along with cryptographic information that is used to control user access of the data items and storage of data items in association with the data structure. As described in more detail below, a data structure includes a record node for each data item that is part of the data structure. Additionally, the data structure includes an access node for each user that has rights to access the data items that are part of the data structure and can store data items in association with the data structure.

The creation module 304 processes user requests to create new data structures. A user may request to create a new data structure when the user desires for specific users to have access to certain data items. For example, a user may create a new data structure in order to include data items that are specific to a group within a company and for members of the group to be able to access the data items. When a request is made by a user through a client device 102 to create a new data structure, the data storage system 104 determines whether the user can request the creation of new data structures. In one embodiment, every user of the data storage system 104 can request the creation of new data structures. In another embodiment, specific users of the data storage system 104 have authority to create new data structures. In one embodiment, the creation module 304 maintains the public keys of the users that have authority to create new data structures. The request made by the user includes a digital signature generated by the user's client device 102 using the user's private key. If the creation module 304 is able to verify the digital signature using one of the maintained public keys, the creation module 304 determines that the user is authorized to create a new data structure.

If the creation module 304 determines that the user is authorized to create a new data structure, the creation module 304 generates a root node in the data structure storage 302. The root node is the genesis of the data structure. The user is the administrator of the data structure and the user's public key is included in the root node. An administrator of a data structure has control over which users have access rights to the data structure. In one embodiment, the creation module 304 also includes in the root node information that identifies the data structure (e.g., a numeric identifier).

In one embodiment, a data structure may have multiple administrators. When a data structure has multiple administrators, the creation module 304 includes in the root node the public key of each administrator. In one embodiment, when a user requests the creation of a data structure, the user provides the public key of each user that is to be an administrator of the data structure.

The permission module 306 provides and revokes users' access rights to data structures. In one embodiment, when a user has access rights to a data structure, the user can access each data item that is part of the data structure and can store new data items in association with the data structure. For example, returning to FIG. 2D, under this embodiment, the first user and the second can access the data items associated with record nodes 208, 210, and 212 because the users have access rights to the data structure 200 through access nodes 204 and 206. In another embodiment, when a user has access rights to a data structure, the user can only access data items of the data structure whose respective record nodes include the user's public key as an output. For example returning to FIG. 2D, under this embodiment, the first user would be able to access the data item associated with record node 208 because record node 208 includes the first user's public key as an output. The second user would be able to access the content items associated with record nodes 210 and 212 because they include the second user's public key as an output.

When the data storage system 104 receives a request from a client device 102 to provide a user access rights to a data structure, the permission module 306 determines whether the user of the client device 102 that initiated the request is an administrator of the data structure. To determine whether the user is an administrator, the permission module 306 identifies a digital signature included with the request. The digital signature is generated by the client device 102 using the user's private key. The permission module 306 additionally identifies the root node of the data structure in the data structure storage 302. If the permission module 306 is able to verify the digital signature using a public key included in the root node, the permission module 306 determines that the user is an administrator of the data structure.

If the user is an administrator of the data structure, the permission module 306 creates an access node in the data structure connected directly to the root node as a child node. The permission module 306 includes in the access node an input that is a hash digest of the root node, an output that is a public key of the user being granted access rights, and data that indicates that the user associated with the public key has access rights to the data structure. In one embodiment, the public key of the user being granted access rights is provided to the permission module 306 in the request made by the administrator. In other embodiments, different or additional information may be included as the output to indicate the user granted access rights, such as one or more public keys, business logic, executable code, or any combination of the aforementioned.

In one embodiment, when a user is added by the creation module 304 as an administrator of a data structure, the permission module 306 automatically creates an access node directly connected to the root node to provide the administrator with access rights to the data structure. The permission module 306 includes in the access node an input that is a hash digest of the root node, an output that is a public key of the administrator, and data that indicates that the user associated with the public key has access rights to the data structure.

When the data storage system 104 receives a request from a client device 102 to revoke a user access rights to a data structure, the permission module 306 determines whether the user of the client device 102 initiating the request is an administrator of the data structure. Similar to above, the permission module 306 determines whether the user is an administrator based on a digital signature included with the request and one or more public key included in the root node of the data structure in the data structure storage 302.

If a determination is made that the user is an administrator of the data structure, the permission module 306 identifies from the administrator's request the public key of the user whose access rights are being revoked. The permission module 306 identifies in the data structure an access node that includes the public key as an output of the access node. The permission module 306 creates a new access node directly connected to the identified access node as a child node. The permission module 306 generates a hash digest of the identified access node and includes the generated hash digest in the new access node as an input. In one embodiment, the permission module 306 also includes in the new access node an output that is the public key of the administrator and data that indicates the access rights of the user have been revoked. By connecting the new child access node to the identified access node, the user's access rights are revoked.

The verification module 308 determines whether users have access rights to data structures. Upon request from the storage module 310 or the access module 312, the verification module 308 determines whether a user has access rights to a data structure. The request includes an identifier of the data structure and a digital signature generated by the user's client device 102 using the user's private key.

To determine whether the user has access rights to the data structure, the verification module 308 identifies in the data structure storage 302 the access nodes of the data structure that have no child node. In one embodiment, the verification module 308 also verifies that the identified nodes include an input that is a hash digest of the root node of the data structure. Each of the identified access nodes includes a public key as an output. If the verification module 308 is able to verify the digital signature using the output public key of one of the identified access nodes, the verification module 308 determines that the user has access rights to the data structure. If the verification module 308 is not able to verify the digital signature using the output public key of one of the identified access nodes, the verification module 308 determines that the user does not have access rights to the data structure. The verification module 308 notifies the storage module 310 or the access module 312 that made the request of its determination as to whether the user has access rights to the data structure.

The storage module 310 processes user requests to store data items in association with data structures. When a request is received by the data storage system 104 from a user's client device 102 to store a data item in association with a data structure, the storage module 310 determines which node of the data structure the request indicates that the data item is to be directly linked to in the data structure. In one embodiment, the request indicates the node by including a hash digest of the node. If the request indicates that the data item be directly linked to the root node, the storage module 310 requests that the verification module 308 determine whether the user has access rights to the data structure and provides to the verification module 308 the information of the request received from the client device 102.

If the verification module 308 determines that the user does not have access rights to the data structure, the storage module 310 transmits a notification to the client device 102 denying the request. However, if the verification module 308 determines that the user has access rights to the data structure, the storage module 310 creates a record node directly connected to the root node of the data structure as a child node. By creating a record node directly connected to the root node, the storage module 310 is creating a new node lineage for the data structure. A node lineage is a path of nodes in the data structure from the root node to a node with no child nodes.

The storage module 310 includes in the created record node the data item that the user requested be stored. In another embodiment, instead of including the data item, a pointer to a location where the data item is stored is included in the record node. The storage module 310 generates a hash digest of the root node and includes the hash digest in the record node as an input. Additionally, the storage module 310 determines from the request received from the client device 102, the public key of the user that is to have ownership rights to the record node. The storage module 310 includes the public key in the record node as an output. If the request received from the client device 102 includes the public keys of multiple users that are to have ownership rights to the record node, the storage module 310 includes multiple outputs in the record node, each output for a different public key. A user with ownership rights to a record node can add a data item in the data structure directly linked to the record node. In other embodiments, different or additional information is included as the output to indicate the one or more users that have ownership rights to a record node. The information included, may be, for example, one or more public keys, business logic, executable code, or any combination of the aforementioned.

In the embodiment described above, a user with access rights to the data structure can store data items directly linked to the root node. The user may or may not be an administrator. However, in other embodiments only administrators of the data structure can store data items directly linked to the root node. In the other embodiments, the storage module 310 verifies that a user is an administrator before creating a record node.

If the request received from the client device 102 indicates that the data item be directly linked to a record node of the data structure, the storage module 310 determines whether the user has ownership rights to the record node that would allow for the storage of a data item that is directly linked to the record node. To determine whether the user has ownership rights to the record node, the storage module 310 identifies the digital signature included with the request. Additionally, the storage module 310 identifies the record node of the data structure in the data structure storage 302. If the storage module 310 is able to verify the digital signature using a public key included in the record node as an output, the storage module 310 determines that the user has ownership rights to the record node.

If it is determined that the user does not have ownership rights, the storage module 310 transmits a notification to the client device 102 indicating that the request has been denied. However, if is determined that the user has ownership rights to the record node, the storage module 310 requests that the verification module 308 determine whether the user has access rights to the data structure (e.g., verify that the user's access rights to the data structure have not been revoked).

If the verification module 308 determines that the user does not have access rights to the data structure, the storage module 310 transmits a notification to the client device 102 indicating that the request has been denied. On the other hand, if the verification module 308 determines that the user has access rights to the data structure, the storage module 310 creates a record node directly connected to the record node identified by the request received from the client device 102. The created record node is a child node of the record node identified by the request. The storage module 310 includes in the created record node the data item that the user requested be stored. In another embodiment, instead of including the data item, a pointer to a location where the data item is stored is included in the record node. The storage module 310 generates a hash digest of the record node identified by the request and includes the hash digest in the created record node. Additionally, the storage module 310 determines from the request received from the client device 102, the public key of the user that is to have ownership rights to the record node. The storage module 310 includes the public key in the record node as an output. If the request received from the client device 102 includes the public keys of multiple users that are to have ownership rights to the record node, the storage module 310 includes in the record node multiple outputs, each output for a different public key.

The access module 312 provides users with access to data items of data structures. When a request is received by the data storage system 104 from a user's client device 102 to view the data items that are part of a data structure, the access module 312 forwards information of the request to the verification module 308 and requests that the verification module 308 determine whether the user has access rights to the data structure.

If the verification module 308 determines that the user does not have access rights to the data structure, the storage module 310 transmits a notification to the client device 102 indicating that the request has been denied. However, if the verification module 308 determines that the user has access rights to the data structure, the access module 312 identifies the record nodes of the data structure in the data structure storage 302. The verification module 308 transmits to the client device 102 information to display representations of the record nodes. The representation of each record node indicates the data item associated with the record node and includes an identifier of the record node that can be used to request access to the data item. In one embodiment, the identifier is a hash digest of the record node. In another embodiment, the identifier is the input of the record node.

When a request is received by the data storage system 104 from a user's client device 102 to access a data item associated with a record node of a data structure, the access module 312 verifies that the verification module 308 has already determined that the user has access rights to the data structure. If the verification module 308 has not already determined that the user has access rights to the data structure, the access module 312 requests that the verification module 308 make a determination. If the user has access rights to the data structure, the access module 312 identifies the identifier of the record node included in the request. The access module 312 identifies the record node in the data structure storage 302 based on the identifier. The access module 312 transmits the data item included in the record node to the client device 102. If the record node includes a pointer to where the data item is stored instead of the data item, the access module 312 uses the pointer to retrieve the data item and transmits the data item to the client device 102. In another embodiment, the access module 312 transmits the data item to the client device 102 only if the record node includes an output that is a public key of the user.

Figure 4:
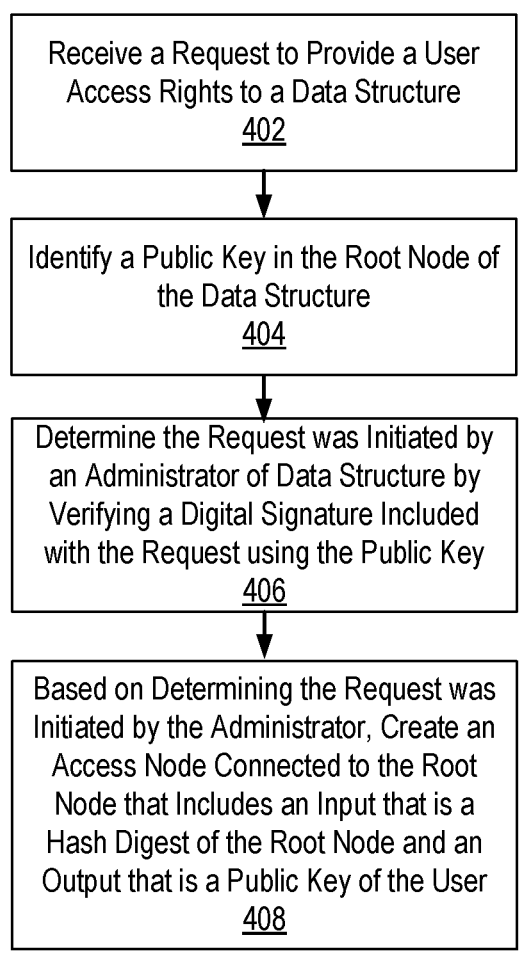
FIG. 4 is a flow chart illustrating a process for providing a user access rights to a data structure in accordance with one embodiment.

FIG. 4 is a flow chart illustrating a process 400 for providing a user access rights to a data structure in accordance with one embodiment. Assume for purposes of this example that the data structure includes a root node and multiple record nodes including data items. Additionally, for this example assume that only an administrator of the data structure can request that access rights be granted to the data structure.

The data storage system 104 receives 402 from a client device 102 a request to provide a user access rights to the data structure. The request includes a digital signature generated by the client device 102 using a private key of a user of the client device 102 that initiated the request. The request also includes the public key of the user for which access rights are being requested. The data storage system 104 identifies 404 a public key included in the root node of the data structure. The public key is associated with the administrator of the data structure. The data storage system 104 determines 406 the request was initiated by the administrator of the data structure by verifying the digital signature using the public key.

The data storage system 104 creates 408 an access node directly connected to the root node based on determining that the request was initiated by the administrator. The access node includes an input that is a hash digest of the root node and output that is a public key of the user for which access rights were requested. In one embodiment, the access node also includes data that indicates the user associated with the public key of the output has access rights to the data structure. The creation of the access node provides the user access rights to the data structure.

Figure 5:
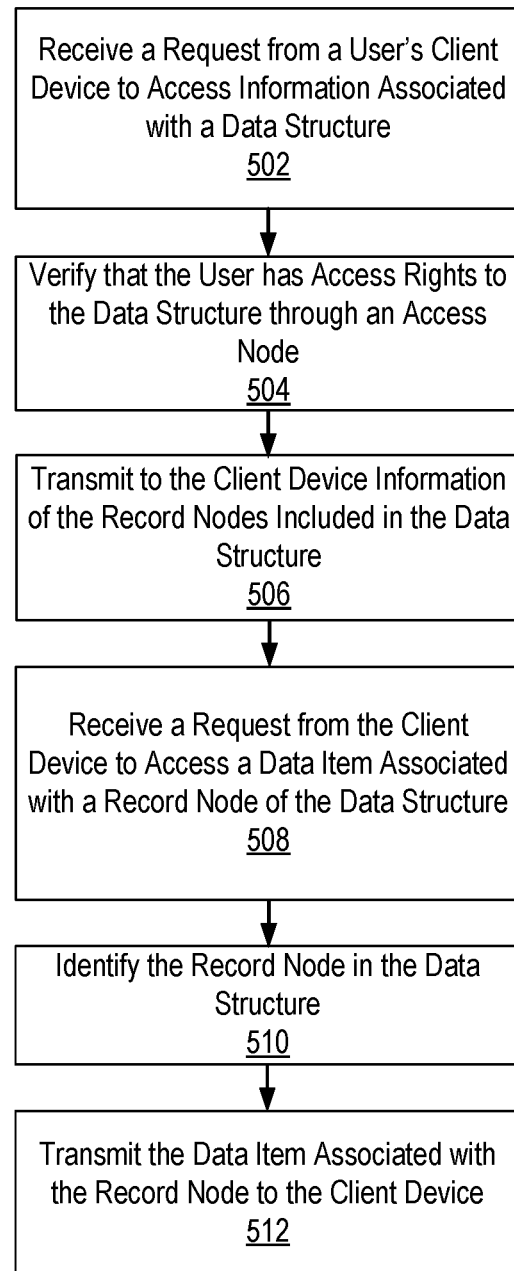
FIG. 5 is a flow chart illustrating a process for accessing information of a data structure in accordance with one embodiment.

FIG. 5 is a flow chart illustrating a process 500 for accessing information of a data structure in accordance with one embodiment. Assume for purposes of this example that the data structure includes a root node, access nodes granting users access rights to the data structure, and record nodes including data items.

The data storage system 104 receives 502 a request from a user's client device 102 to access information associated with the data structure. The request includes a digital signature generated using the user's private key. The data storage system 104 verifies 504 that the user has access rights to the data structure. In one embodiment, the data storage system 104 verifies that the user has access rights by identifying each access node in the data structure that has no child node. Each identified access node includes a public key as an output. The data storage system 104 determines that the user has access rights based on verifying the digital signature using the public key included in one of the identified access nodes.

The data storage system 104 transmits 506 to the client device 102 information of the record nodes included in the data structure. In one embodiment, the information includes for each record node the data item associated with the record node and an identifier associated with the record node that can be used to request access to the data item. The data storage system 104 receives 508 a request from the client device to access a data item associated with a record node of the data structure. The request includes an identifier associated with the record node. The data storage system 104 identifies 510 the record node in the data structure based on the identifier. The data storage system 104 transmits 512 the data item associated with the record node to the client device 102.

Figure 6:
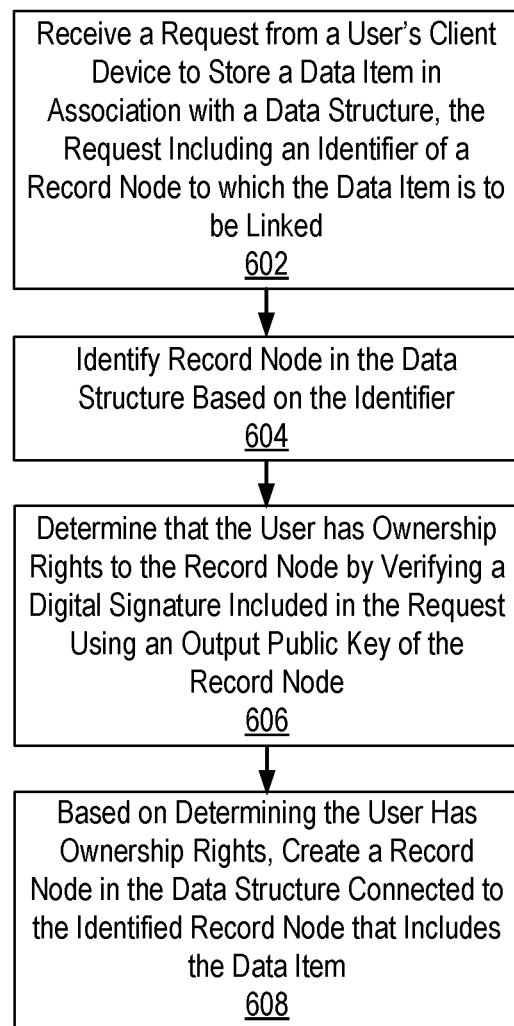
FIG. 6 is a flow chart illustrating a process for processing a request to store a data item in association with a data structure in accordance with one embodiment.

FIG. 6 is a flow chart illustrating a process 600 for processing a request to store a data item in association with a data structure in accordance with one embodiment. Assume for purposes of this example that the user making the request has access rights to the data structure.

The data storage system 104 receives 602 the request from the user's client device 102. The request includes an identifier of a record node of the data structure to which the data item is to be directly linked. The request also includes the data item and a digital signature generated by the client device 102 using the user's private key. The data storage system 104 identifies 604 the record node in the data structure based on the identifier. The identified record node includes an output that is a public key.

The data storage system 104 determines 606 that the user has ownership rights to the record node by verifying the digital signature using the output public key. The data storage system 104 creates 608 a record node in the data structure directly connected to the identified record node based on determining that the user has ownership rights to the record node. The created record node includes the data item. Additionally, the created record node includes an input that is a hash digest of the identified record node. The created record node also includes the public key of the user that has ownership rights to the created record node. In one embodiment, request includes the public key of the user that is to have ownership rights.

Figure 7:
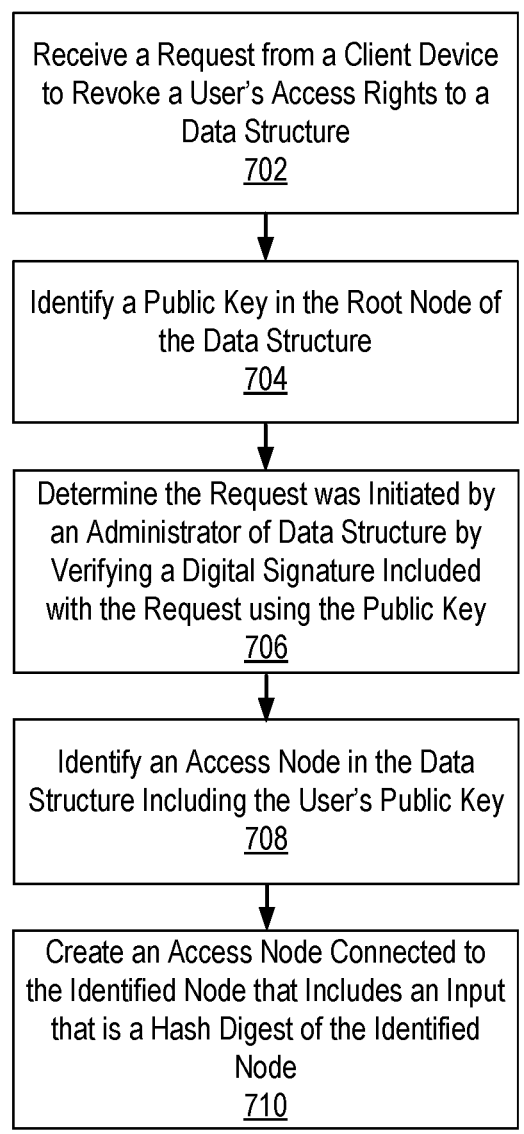
FIG. 7 is a flow chart illustrating a process for revoking a user's access rights to a data structure in accordance with one embodiment.

FIG. 7 is a flow chart illustrating a process 700 for revoking a user's access rights to a data structure in accordance with one embodiment. Assume for purposes of this example, that the data structure includes an access node directly connected to the root node of the data structure and that the access node includes a public key of the user as an output. The access node does not include a child node. Further, assume that only an administrator of the data structure can request to revoke a user's access rights.

The data storage system 104 receives 702 a request from a client device 102 to revoke the user's access rights. The request includes the public key of the user whose access rights are to be revoked. The request also includes a digital signature generated using the private key of a user that initiated the request. The data storage system 104 identifies 704 a public key included in the root node of the data structure. The public key is associated with the administrator of the data structure. The data storage system 104 determines 706 the request was initiated by the administrator of the data structure by verifying the digital signature using the public key.

The data storage system 104 identifies 708 the access node in the data structure that includes the public key of the user whose access rights are being revoked. The data storage system 104 creates 710 an access node in the data structure directly connected to the identified access node. The created access node is a child node of the identified access node. The created access node includes an input that is a hash digest of the identified access node. In one embodiment, the access node also includes an output that is the public key of the administrator and data indicating that the user's access rights have been revoked.

Those of skill in the art will recognize that other embodiments can perform the steps described for FIGS. 4-7 in different order. Moreover, other embodiments can include different and/or additional steps than the ones described.

Figure 8:
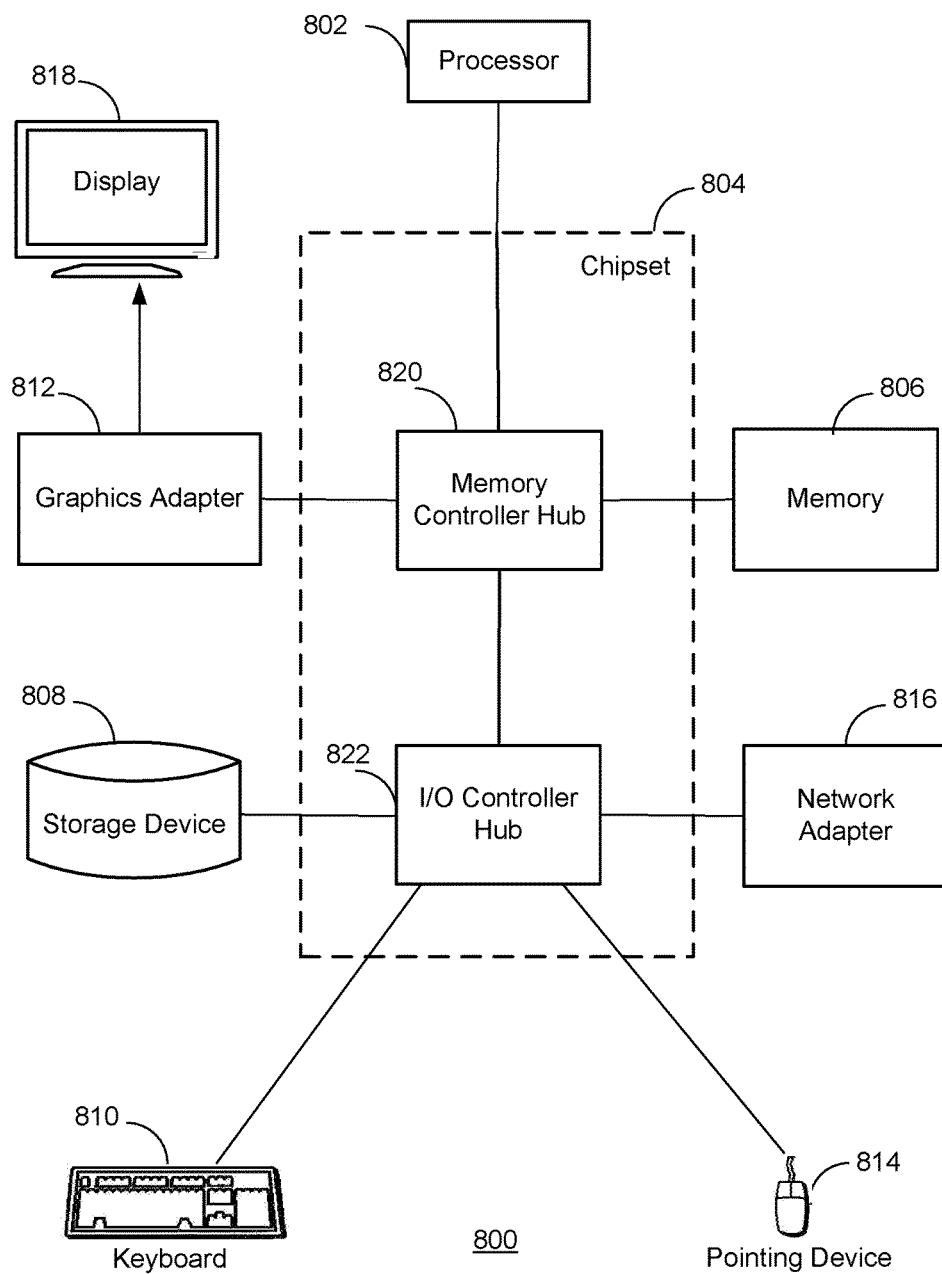
FIG. 8 is a block diagram illustrating a functional view of a computer system in accordance with one embodiment.

FIG. 8 is a block diagram illustrating a functional view of a computer system 800 for use as one of the systems illustrated in the environment 100 of FIG. 1 in accordance with one embodiment. Illustrated are at least one processor 802 coupled to a chipset 804. Also coupled to the chipset 804 are a memory 806, a storage device 808, a keyboard 810, a graphics adapter 812, a pointing device 814, and a network adapter 816. A display 818 is coupled to the graphics adapter 812. In one embodiment, the functionality of the chipset 804 is provided by a memory controller hub 820 and an I/O controller hub 822. In another embodiment, the memory 806 is coupled directly to the processor 802 instead of the chipset 804.

The storage device 808 is a non-transitory computer-readable storage medium, such as a hard drive, compact disk read-only memory (CD-ROM), DVD, or a solid-state memory device. The memory 806 holds instructions and data used by the processor 802. The pointing device 814 may be a mouse, track ball, or other type of pointing device, and is used in combination with the keyboard 810 to input data into the computer system 800. The graphics adapter 812 displays images and other information on the display 818. The network adapter 816 couples the computer system 800 to the network 106. Some embodiments of the computer system 800 have different and/or other components than those shown in FIG. 8.

The computer 800 is adapted to execute the modules of FIG. 3 and the processes of FIG. 4-7 for providing the functionality described herein. As used herein, the term "module" to refers to computer program instruction and other logic for providing a specified functionality. A module can be implemented in hardware, firmware, and/or software. A module is typically stored on the storage device 808, loaded into the memory 806, and executed by the processor 802.

A module can include one or more processes, and/or be provided by only part of a process. Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

The types of computer systems 800 used by the systems of FIG. 1 can vary depending upon the embodiment and the processing power used by the entity. For example, a client device 102 such as a mobile phone typically has limited processing power and a small display 818. The data storage system 104, in contrast, may comprise multiple blade servers working together to provide the functionality described herein.

The foregoing described embodiments have been presented for the purpose of illustration; they are not intended to be exhaustive or to limiting to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, described modules may be embodied in software, firmware, hardware, or any combinations thereof.

Reference in the specification to "one embodiment" or to "an embodiment" means that a particular feature, structure, or characteristic is included in at least one embodiment of the disclosure. The appearances of the phrase "in one embodiment" or "a preferred embodiment" in various places in the specification are not necessarily referring to the same embodiment.

Some portions of the above are presented in terms of methods and symbolic representations of operations on data bits within a computer memory. These descriptions and representations are the means used by those skilled in the art to most effectively convey the substance of their work to others skilled in the art. A method is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects disclosed herein include process steps and instructions described herein in the form of a method. It should be noted that the process steps and instructions described herein can be embodied in software, firmware or hardware, and when embodied in software, can be downloaded to reside on and be operated from different platforms used by a variety of operating systems.

The embodiments discussed above also relates to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The methods and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the embodiments are not described with reference to any particular programming language. It will be appreciated that a variety of programming languages may be used to implement the teachings described herein, and any references below to specific languages are provided for disclosure of enablement and best mode.

While the disclosure has been particularly shown and described with reference to a preferred embodiment and several alternate embodiments, it will be understood by persons skilled in the relevant art that various changes in form and details can be made therein without departing from the spirit and scope of the invention.

Finally, it should be noted that the language used in the specification has been principally selected for readability and instructional purposes, and may not have been selected to delineate or circumscribe the inventive subject matter. Accordingly, the disclosure is intended to be illustrative, but not limiting, of the scope of the invention.

What is claimed is:

1. A computer implemented method comprising:
receiving, by a data storage system from a client device associated with a user, a request to access a data item included in a graph data structure comprising a plurality of linked nodes including a root node, a set of access nodes specifying access permissions for the graph data structure, and a set of record nodes of data items for the graph data structure, wherein the set of record nodes comprises a record node including the data item, the record node including the data item part of a node lineage including the root node and the set of record nodes, each record node in the set of record nodes including a hash digest of a parent node of the record node in the node lineage;
determining, by the data storage system, that the user has access rights to the data item by:
identifying, of access nodes directly connected to the root node of the data structure, a first access including a hash digest of the root node and cryptographic information associated with the user; and
determining that the first access node does not have any child nodes in the graph data structure;
transmitting, by the data storage system, the data item to the client device associated with the user in response to determining that the user has access rights to the data item;
receiving, by the data storage system from a client device associated with a second user, a request to access a data item included in the graph data structure;
determining, by the data storage system, that the second user does not have access rights to the data item requested by the client device associated with the second user by:
identifying, of access nodes directly connected to the root node of the data structure, a second access node including a hash digest of the root node and cryptographic information associated with the second user; and
identifying a child node directly connected to the second access node and including a hash digest of the second access node, the child node revoking access rights of the second user; and
responsive to the determination that the second user does not have access rights, denying, by the data storage system, access to the data item for the received request from the client device associated with the second user.

2. The method of claim 1, wherein the cryptographic information associated with the user is a public key associated with the user.

3. The method of claim 1, wherein determining that the user has access rights to the data item further comprises:
receiving, from the client device associated with the user, a digital signature generated using a private key associated with the user; and
verifying the digital signature using a public key included in the first access node.

4. The method of claim 1, wherein determining that the user has access rights to the data item further comprises:
determining that the record node including the data item includes the cryptographic information associated with the user.

5. The method of claim 1, further comprising:
receiving an additional request to access the data item from an additional client device associated with a third user; and
determining that the third user does not have access rights to the data item based on access nodes directly connected to the root node of the data structure not including an access node including cryptographic information associated with the third user.

6. A computer implemented method comprising:
receiving, by a data storage system from a client device associated with a user, a request to store a data item in association with a graph data structure comprising a plurality of linked nodes including a root node, a set of access nodes specifying access permissions for the graph data structure, and a set of record nodes of data items for the graph data structure, each record node including a hash digest of a parent node of the record node in a node lineage of the record node;
identifying, by the data storage system, a first record node of the set of record nodes, the first record node connected to the root node of the data structure;

determining, by the data storage system, whether the user has ownership rights to the first record node by:
  identifying, of access nodes directly connected to the root node of the data structure, a first access node including a hash digest of the root node and cryptographic information associated with the user; and
  determining that the first access node does not have any child nodes in the graph data structure;
creating, by the data storage system, a second record node connected to the first record node in response to determining that the user has ownership rights to the first record node, the second record node including the data item and a hash digest of the first record node;
receiving, by a data storage system from a client device associated with a second user, a request to store a second data item in association with the graph data structure;
identifying, by the data storage system, a third record node of the set of record nodes, the third record node connected to the root node of the data structure;
determining, by the data storage system, that the second user does not have ownership rights to the third record node by:
  identifying, of access nodes directly connected to the root node of the data structure, a second access node including a hash digest of the root node and cryptographic information associated with the second user; and
  identifying a child node directly connected to the second access node and including a hash digest of the second access node, the child node revoking ownership rights of the second user; and
responsive to the determination that the second user does not have ownership rights to the third record node, denying, by the data storage system, the request to store the second data item in association with the graph data structure.

7. The method of claim 6, wherein the first record node is identified based on the request to store the data item indicating that the data item is to be linked to the first record node.

8. The method of claim 6, wherein the cryptographic information associated with the user is a public key and determining whether the user has ownership rights to the first record node further comprises:
  receiving, from the client device associated with the user, a digital signature generated using a private key associated with the user; and
  determining that the user has ownership rights to the first record node in response to verifying the digital signature using the public key included in the first record node.

9. The method of claim 6, wherein creating the second record node comprises:
  creating the second record in response to determining that the user has ownership rights to the first record node and the user has access rights to the data structure.

10. The method of claim 9, further comprising:
  receiving, from the client device, a digital signature generated using a private key associated with the user; and
  determining that the user has access rights to the data structure in response to verifying the digital signature using a public key included in a third access node of access nodes directly connected to the root node of the data structure, the third access node including a hash digest of the root node.

11. The method of claim 6, wherein the second record node includes a public key of an additional user with ownership rights to store an additional data item directly linked to the second record node.

* * * * *

UNITED STATES PATENT AND TRADEMARK OFFICE
CERTIFICATE OF CORRECTION

PATENT NO. : 10,607,025 B2
APPLICATION NO. : 15/267116
DATED : March 31, 2020
INVENTOR(S) : Andrew James Rasmussen Page 1 of 1

It is certified that error appears in the above-identified patent and that said Letters Patent is hereby corrected as shown below:

In the Claims

Column 16, Line 2, Claim 1, after "access", insert --node--.

Signed and Sealed this
Thirty-first Day of August, 2021

Drew Hirshfeld
*Performing the Functions and Duties of the
Under Secretary of Commerce for Intellectual Property and
Director of the United States Patent and Trademark Office*